United States Patent [19]

Boyle et al.

[11] 4,042,197
[45] Aug. 16, 1977

[54] AUTOMATIC CONTROLS FOR AIRPLANE TAKE-OFF AND LANDING MODES

[75] Inventors: James Alfred Boyle, Bellevue; Peteris Adams Galins, Renton; Mark Charles Gregoire, Issaquah; Peter L. M. O'Toole, Bellevue, all of Wash.

[73] Assignee: The Boeing Company, Seattle, Wash.

[21] Appl. No.: 617,621

[22] Filed: Sept. 29, 1975

[51] Int. Cl.² .............................................. G05D 1/12
[52] U.S. Cl. .............................. 244/183; 235/150.22; 244/178; 244/188
[58] Field of Search ........................ 73/178 T, 178 R; 235/150.2, 150.22, 151.32; 244/42 A, 42 D, 42 DA, 77 A, 77 D, 77 F, 181, 182, 183, 185, 186, 188, 178; 318/583, 584; 340/27 SS

[56] References Cited

U.S. PATENT DOCUMENTS

| 2,350,751 | 6/1944  | Gliubich     | 244/77 D X   |
| 3,077,110 | 2/1963  | Gold         | 235/150.22 X |
| 3,522,729 | 4/1970  | Miller       | 244/77 D X   |
| 3,614,036 | 10/1971 | Foster       | 244/77 A X   |
| 3,618,878 | 11/1971 | Klein et al. | 244/188      |

Primary Examiner—Stephen G. Kunin
Attorney, Agent, or Firm—Morris A. Case

[57] ABSTRACT

A take-off and landing control device for automatic retraction of flaps upon stowing landing gear and upon attaining a predetermined airspeed and of indicating distance from brake release during take-off, and for an automatic decelerating approach with flaps extending as a function of distance from touchdown with automatic throttle cutback and automatic stabilizer trim in response to flap location maintaining an essentially constant angle of attack.

13 Claims, 2 Drawing Figures

AUTOMATIC CONTROLS FOR AIRPLANE TAKE-OFF AND LANDING MODES

BACKGROUND OF THE INVENTION

Airplanes traditionally take off and land with flaps fixed in an extended position. The extended flaps impart high lift characteristics to the aircraft even at low speeds. During take-off, the throttle is opened and the flaps are retained in an extended position for a considerable distance above the runway. The high thrust while at low altitudes create considerable community noise. During an approach, the flaps are extended while on the glide slope angle at a position several miles from the threshold. The extended flaps present high drag as well as imparting high lift and require substantial engine power to effect a constant configuration steady state approach; which creates a high community noise level. In U.S. Pat. No. 2,350,751, there is disclosed an automatic flap control system to adjust the flaps from extended to flight position when a predetermined speed is reached during take-off and to extend the flaps from normal flight position when airspeed falls below a predetermined value. This is essentially a safety device to extend flaps when the airspeed is low, and retract when airspeed is too high.

It is known to utilize a decelerating approach extending the flaps and cutting back on the engine thrust both as a function of time. This has the disadvantage of not allowing for wind direction and velocity near the ground. It was discovered that significant noise reduction benefits may be gained with the control arrangement as disclosed.

SUMMARY OF THE INVENTION

In a take-off mode the extended flaps are automatically retracted to a predetermined position which may be fully retracted to flight position. The retraction is in response to reaching a sensed predetermined and preset airspeed. A command signal is generated which will be entered only after the landing gear has been raised and stowed away after take-off. The command signal actuates a power source to retract the flaps. Take-off also provides distance measuring a predetermined point from brake release and an indicator to notify when said distance has been reached.

In the approach mode, the disclosure provides for a decelerating approach with the flaps automatically extending during part of the approach as a function of distance from touchdown, the throttle is automatically cut back to a predetermined level during the same period as a function of flap position, and the stabilizer is automatically trimmed as the flap position changes.

It is an oject of this invention to provide noise reduction during take-off and landing modes of an airplane by automatic control of flaps, engine thrust and stabilizer trim.

DETAILED DESCRIPTION

Figure 1:
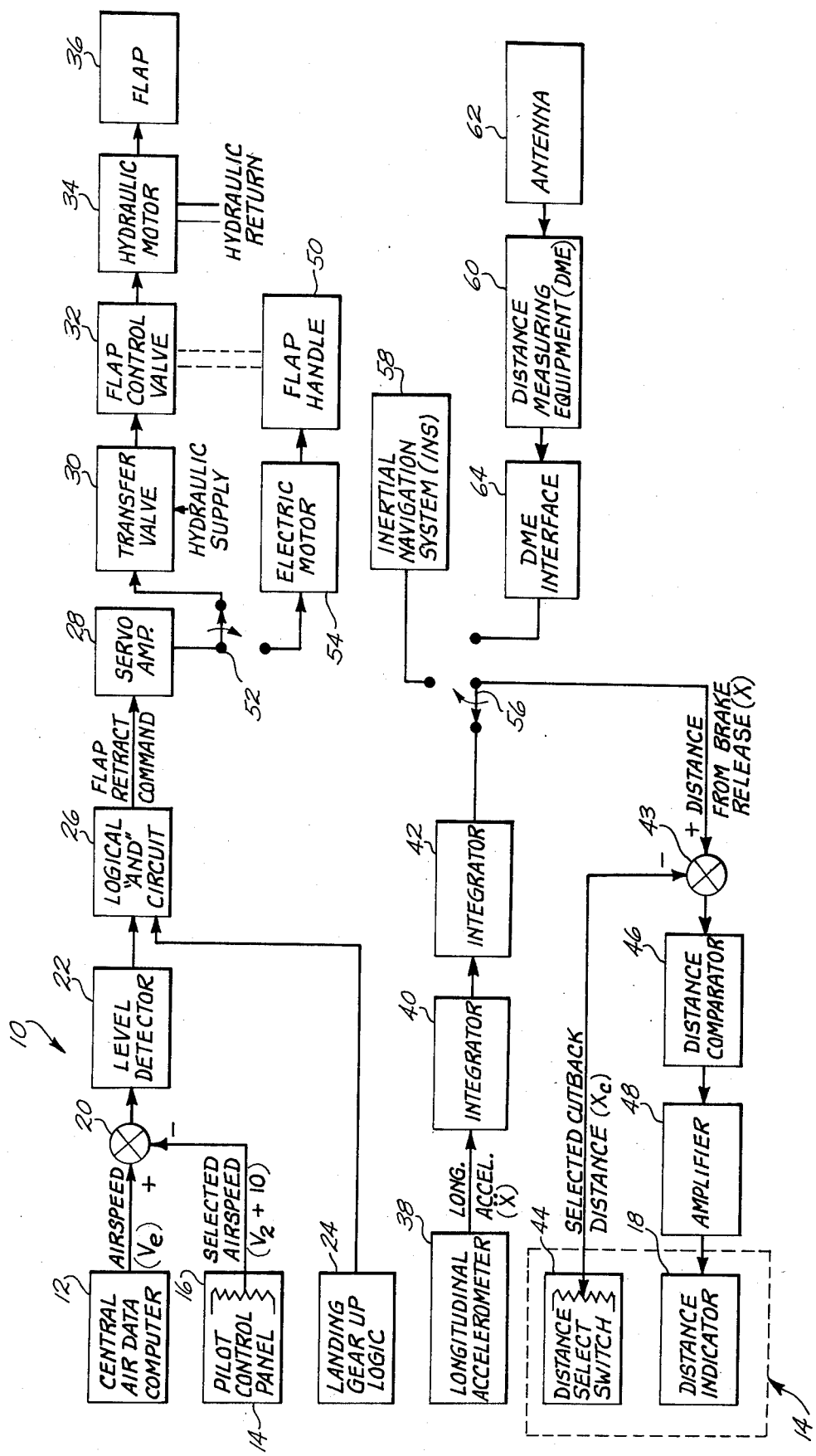
FIG. 1 shows a block diagram of automatic control of an airplane during take-off mode.

In FIG. 1, take-off system 10 has a central air data computer 12 which senses airspeed. Pilot's control panel 14, among other items, has speed reference select dial 16 and distance indicator light 18. Summing junction 20 receives input from the sensed and the referenced speed and imparts a signal to the level detector 22 which transmits a signal once the indicated level has been reached. Switch 24 is located in the landing gear doors. When the gear is stowed, the switch activates summing switch 26 to allow the signal from level detector 22 to pass through to the servo-amplifier 28 for the transfer valve 30 which allows hydraulic fluid to pass through the flap position valve 32 thence to the hydraulic motor 34 which retracts the flaps 36. A longitudinal accelerometer 38 signal is integrated first in integrator 40, then integrator 42 to convert accelerometer information into distance of the airplane from brake release. A summing junction 43 receives the distance signal along with a predetermined distance from brake release as set in the distance select switch 44 of the pilot's panel. This generates a signal—once the preselected position has been reached—which enters comparator 46, amplifier 48, thence into distance indicator light 18.

In operation, the flaps 36 are extended into high lift configuration. The flap handle 50 is moved to the position to which one wishes the flaps to automatically retract, the predetermined airspeed at which the flaps will retract is entered in speed select dial 16 and the preselected distance from take-off or brake release is entered in distance select switch 44 and the take-off initiated. Once airborne, the landing gear will be stowed and a signal transmitted. The flaps will automatically retract in response to the sensed airspeed once said speed exceeds the preselected airspeed, provided the gear is stowed. A voltage proportional to sensed airspeed from the central data computer is summed or compared with voltage proportional to the preselected speed to generate a command voltage which is amplified to actuate the transfer valve and thence the flaps. The flaps will be retracted to the point allowed by the flap handle setting. A voltage proportional to longitudinal acceleration is obtained from the auto-throttle accelerometer 38 which is integrated twice to derive a voltage proportional to distance. This voltage is compared at 43 with voltage proportional to preselected distance and imparts an indicating signal 18 to notify that thrust may be cut back. Thus, during the initial segments of the climb-out, flaps are retracted automatically when speed and gear conditions are met to reduce the drag and improve climb-out capability and increase altitude or thrust cutback. Upon receiving the signal that the preselected distance has been met, the engine thrust is cut, the airplane pitches over and a positive rate of climb is maintained at the reduced thrust. The increased height and reduced thrust reduces the community noise level of the climb-out.

The block diagram of FIG. 1 shows switch 52 to indicate the signal from a servo-amplifier may be used in a different embodiment to energize an electric motor 54 which in turn positions the flap handle and thereby retracts the flap. In the same manner, switch 56 is used to show that other embodiments may use other means of measuring distance to generate a voltage signal to compare with voltage proportional to the preselected distance. An Inertial Navigation System (INS) 58 may be used for determining distance or onboard Distance Measuring Equipment (DME) 60 may be used for determining distance. The DME would include an antenna 62 and a DME interface 64.

Figure 2:
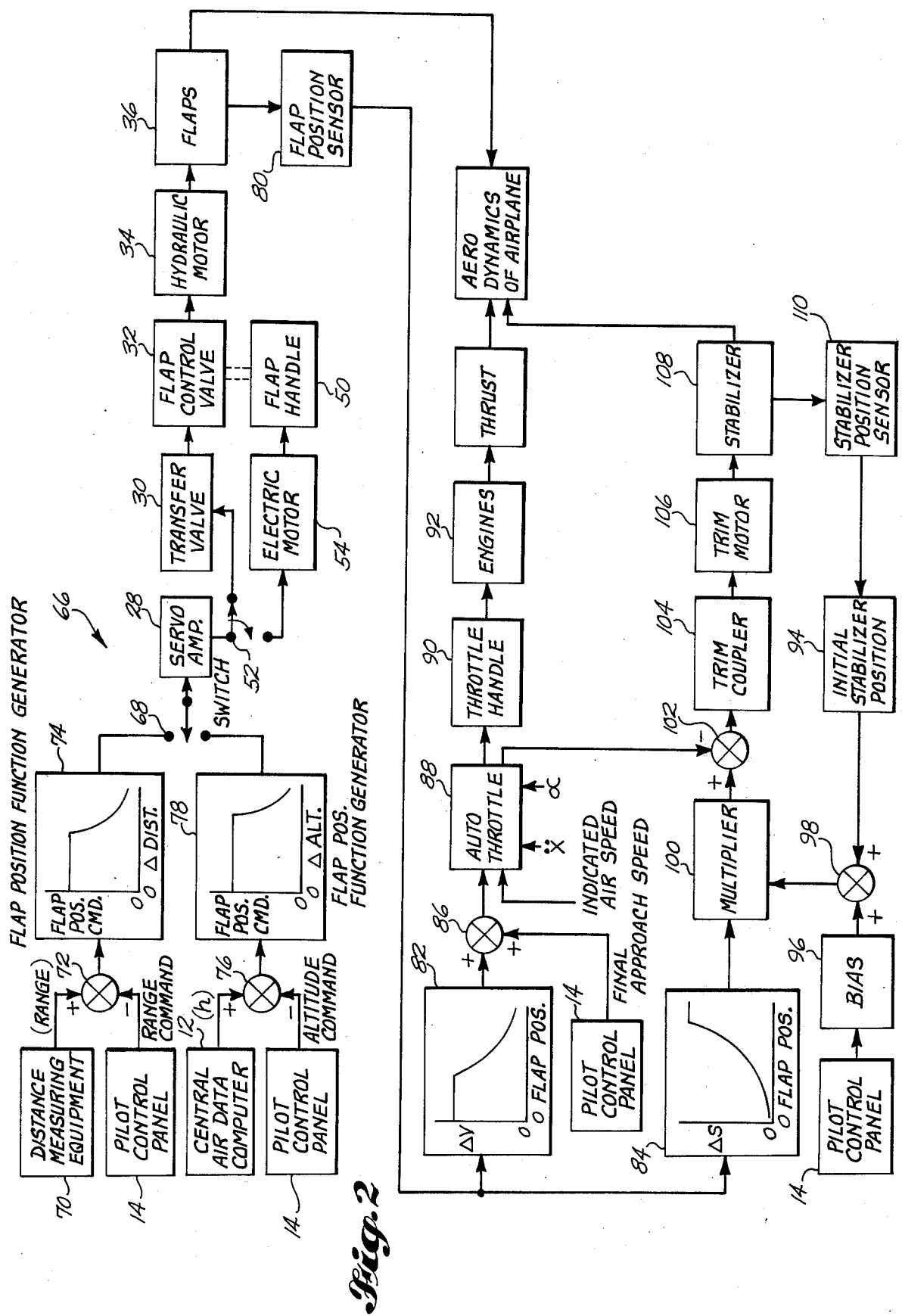
FIG. 2 shows a block diagram of automatic control of an airplane during a decelerating approach.

In FIG. 2, approach system 66 defines a decelerating approach with automatic control of flaps, engine thrust and stabilizer trim. The flaps 36 are extended over a preselected portion of the approach as a function of distance from touch down. A continuing flap command is transmitted to servo-amplifier 28, thence transfer valve 30, flap control valve 32, and hydraulic motor 34 to automatically extend the flaps over the preselected portion of the approach. The flap command may be generated by monitoring horizontal slant or vertical distance. Switch 68 may be used to select the type of control. Using distance monitoring, a computer 70 measures horizontal distance from touchdown. This computer, when used in conjunction with ground distance measuring equipment gives excellent accuracy. A signal proportional to horizontal distance is summed at 72 with a signal proportional to preselected horizontal distance at which the flaps will be fully extended as set in pilot control panel 14 to give a summed signal for inputting into a function generator 74 to convert the distance signal into a flap command signal for inputting to the servo-amplifier. A vertical distance control has a sensed height signal from a central air data computer 12 and a predetermined final height signal from the pilot control panel summed at summing junction 76 to give a command signal to a function generator 78. The function generator converts the signal proportional to height to flap command signal. Sensor 80 indicates flap position and sends a feedback control signal to function generator 82 for throttle control and to function generator 84 for stabilizer trim control. When using vertical distance as the control means for the flap, it is preferable to utilize pressure altitude to generate the required signal than to use radio altitude. Field elevation system and field temperature corrections are entered in the control panel and pressure altitude and static air temperature sensed by the central air data computer to obtain the vertical distance signal. The flaps may be acuated by use of electric motor 54 to move the flap handle 50, and thus the flap control valve 32, in response to the command signal from the servo-amplifier instead of using the transfer valve 30.

The sensed flap position is converted by the function generator 82 to a signal proportional to speed differential which is summed by summing junction 86 with a signal proportional to a final preselected speed as set in the control panel 14 to give a speed command to auto-throttle 88 which, in turn, imparts a throttle command through the throttle handle 90 to engines 92 to impart thrust to the airplane.

The flap position feedback to function generator 84 converts flap position to a trim signal. At the point of starting into the decelerating approach initial stabilizer position 94 as modified by bias 96 as set in the control panel 14 is summed at 98 to impart a signal. This signal, along with the trim signal, goes into multiplier 100 where it is multiplied into a trim command signal which combines with a signal from the auto throttle in summing junction 102, then is transmitted to trim coupler 104 thence trim motor 106 to automatically trim stabilizer 108. A sensor 110 imparts feedback to initial stabilizer position 94.

In operation, the glide slope is entered with landing gear down but with flaps in an intermediate position. The automatic decelerating approach is armed with preselected final distance, speed and the stabilizer bias set in the control panel. The flap handle is removed from a detent to permit movement of the flap control valve. The flap is automatically extended during the preselected distance, and airspeed is automatically reduced to a predetermined amount as the flap is extended. Pitching moments resulting from flap extension and speed reduction are trimmed automatically as flaps extend. The effect of center of gravity variations on the trim requirements is accounted for by using the initial stabilizer position as modified by bias to adjust the input. Upon reaching the preselected distance, which preferably may be about one mile horizontally or about 300 feet vertically from the runway, the flaps are extended and the engines will be spooled-up and the balance of the approach will be in the conventional manner.

What is claimed is:

1. A device for controlling a flight pattern of an aircraft during take-off comprising: means for automatically retracting flaps in response to a sensed predetermined airspeed after stowing landing gear, said means comprising: means for comparing a voltage proportional to a preselected airspeed with a voltage proportional to airspeed from a central air data computer to impart a command voltage, and means for retracting the flaps upon the command voltage being received by the servo-amplifier, wherein the means for retracting the flaps in response to command voltage being received by the servo-amplifier comprises: a transfer valve controlled by the servo-amplifier, and a hydraulic motor driven by hydraulic fluid from the transfer valve; and means for determining and for indicating airplane position over a predetermined ground location at which point engine thrust is cut back to reduce the noise of climb-out.

2. A device for controlling a flight pattern of an aircraft during take-off comprising: means for automatically retracting flaps in response to a sensed predetermined airspeed after stowing landing gear; and means for determining and for indicating airplane position over a predetermined ground location at which point engine thrust is cut back to reduce the noise of climb-out wherein the means for determining and indicating airplane position comprises: means by which distance from point of departure is obtained from an Inertial Navigation System.

3. A device for controlling a flight pattern of an aircraft during take-off comprising: means for automatically retracting flaps in response to a sensed predetermined airspeed after stowing landing gear; and means for determining and for indicating airplane position over a predetermined ground location at which point engine thrust is cut back to reduce the noise of climb-out wherein the means for determining and indicating airplane position comprises: means by which distance from an airport is determined by use of onboard Distance Measuring Equipment receivers.

4. A device for controlling an airplane flight pattern during take-off comprising: means for imparting a landing gear up signal; means for comparing a voltage proportional to airspeed from a central air data computer with a voltage proportional to a preselected airspeed to impart a command voltage; a combination of a servo amplifier, a transfer valve, and a hydraulic motor activated to retract flaps upon receiving the command voltage and the gear up signal; means for twice integrating a proportional voltage from an autothrottle accelerometer, means for comparing the integrated proportional voltage with a voltage proportional to a preselected distance from a take-off starting point to generate a command voltage; an amplifier for the generated command voltage and a signaling device to notify an operator that the preselected position has been reached at which engines may be cut back.

5. An arrangement for automatically controlling a decelerating approach of an airplane comprising: means for generating a continuing flap command signal, over a preselected glide-slope portion of an approach, as a function of distance from touchdown; means for translating the flap command signal into a power source to extend the flaps over the selected interval; means for sensing flap position; and means for automatically reducing thrust to a preselected level and for automatically trimming a stabilizer in response to flap position to maintain an essentially constant angle of attack.

6. An arrangement as in claim 5 wherein the means for generating a flap command comprises: means for continually determining distance from touchdown, and a function generator for converting the determined distance into the flap command signal.

7. An arrangement as in claim 6 wherein distance is measured as horizontal distance to touchdown.

8. An arrangement as in claim 6 wherein distance is measured as vertical distance to touchdown.

9. An arrangement as in claim 5 wherein the means for automatically reducing thrust comprises: a function generator to convert sensed flap position into a speed differential signal; a comparator to compare the speed differential signal with a preselected final speed signal to impart an auto-throttle command signal to the engines.

10. An arrangement as in claim 9 wherein the means for trimming the stabilizer comprises: a function generator to continually convert the sensed flap position into a trim signal; a multiplier to multiply the trim signal with a signal indicating a bias modified stabilizer position at the start of the preselected portion of the approach to give a trim command signal; and a trim motor acted on by the trim command to actuate the stabilizers.

11. An arrangement as in claim 10 further comprising: means for imparting a thrust moment compensation signal from the thrust control auto-throttle to modify the trim command signal.

12. An arrangement for automatically controlling a decelerating approach of an airplane comprising: means for continually determining distance from touchdown, means for converting a determined distance into a flap command signal, means for translating the flap command signal into a power source to extend the flaps, means for sensing flap position, means for converting sensed flap position into a speed differential signal, means for adding the speed differential signal to the preselected final speed signal to obtain a speed command signal; means for comparing the speed command signal with a signal proportional to airspeed to generate a speed reducing signal; an auto-throttle to transmit the signal to reduce the thrust of the engines, means for converting sensed flap position into a trim differential signal; means for generating a signal based on stabilizer position at the start of the decelerating approach as modified by a bias signal; means for summing the modified stabilizer initial position signal with the trim differential signal to obtain an automatic trim command signal; and means for utilizing the command signal to actuate the stabilizer.

13. A method of controlling a flight pattern of an aircraft during take-off and approach modes, the steps comprising: extending the flaps for take-off; entering a predetermined speed in a control panel; engaging an automatic flap mode to compare actual speed with the predetermined speed to retract the flaps with landing gear stowed and predetermined speed reached; arming an automatic signalling device to indicate reaching a preselected distance from the start of the take-off; cutting back on the throttle, during climbout, upon receiving the distance signal; selecting a distance interval from touchdown for a decelerating approach during the approach mode; arming the automatic flap control to extend the flaps in response to distance from touchdown; entering a predetermined lower limit of speed for the end of the decelerating approach; arming the automatic decelerating throttle controls to reduce thrust in response to sensed flap position; entering a bias to stabilizer position at point of initial deceleration, and arming an automatic trim control system to respond to sensed flap position in combination with bias modified initial stabilizer position.

* * * * *

UNITED STATES PATENT AND TRADEMARK OFFICE
CERTIFICATE OF CORRECTION

PATENT NO. : 4,042,197
DATED : August 16, 1977
INVENTOR(S) : James Alfred Boyle, et al It is certified that error appears in the above-identified patent and that said Letters Patent are hereby corrected as shown below:

On the front page of the patent please insert

--Ronald K. Kawasaki, Phoenix, Arizona-- after the name of the last inventor listed.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks